United States Patent
Komatsu

(10) Patent No.: US 6,803,982 B2
(45) Date of Patent: Oct. 12, 2004

(54) IN-PLANE SWITCHING MODE LIQUID CRYSTAL DISPLAY DEVICE INCLUDING COMMON ELECTRODE ON PASSIVATION LAYER WHICH IS FORMED OVER TFT AND DATA ELECTRODE

(75) Inventor: Hiroshi Komatsu, Kumi-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/015,765

(22) Filed: Dec. 17, 2001

(65) Prior Publication Data

US 2002/0067455 A1 Jun. 6, 2002

Related U.S. Application Data

(63) Continuation of application No. 09/116,707, filed on Jul. 17, 1998, now Pat. No. 6,335,770.

(30) Foreign Application Priority Data

Jul. 22, 1997 (KR) ............................................. 97-34196
Jul. 31, 1997 (KR) ............................................. 97-36569

(51) Int. Cl.[7] ..................... G02F 1/1343; G02F 1/1337; G02F 1/1333
(52) U.S. Cl. ........................ 349/141; 349/38; 349/123; 349/138
(58) Field of Search ............................ 349/38, 44, 110, 349/123, 129, 138, 141

(56) References Cited

U.S. PATENT DOCUMENTS

| | | | | |
|---|---|---|---|---|
| 5,598,285 A | * | 1/1997 | Kondo et al. | 349/39 |
| 5,905,556 A | * | 5/1999 | Suzuki et al. | 349/141 |
| 6,091,473 A | * | 7/2000 | Hebiguchi | 349/138 |
| 6,137,557 A | * | 10/2000 | Hebiguchi et al. | 349/141 |
| 6,256,081 B1 | * | 7/2001 | Lee et al. | 349/141 |
| 6,281,953 B1 | * | 8/2001 | Lee et al. | 349/141 |
| 6,285,429 B1 | * | 9/2001 | Nishida et al. | 349/118 |
| 6,342,939 B1 | * | 1/2002 | Hirata et al. | 349/143 |
| 2002/0060764 A1 | * | 5/2002 | Taniguchi et al. | 349/130 |

* cited by examiner

*Primary Examiner*—Tarifur R. Chowdhury
(74) *Attorney, Agent, or Firm*—McKenna Long & Aldridge LLP

(57) ABSTRACT

An in-plane switching mode liquid crystal display device is disclosed which comprises first and second substrates, a plurality of gate and data bus lines formed on said first substrate to define a plurality of pixel regions, a common bus line aligned in each pixel regions of the first substrate, a thin film transistor (TFT) formed at each pixel regions of the first substrate, a data electrode which is formed on a gate insulator of the TFT and has a portion overlapping the common bus line for forming a first storage capacitor, a passivation layer formed over the data electrode and the TFT, a common electrode which is formed on the passivation layer so as to overlap the gate and data bus lines and has a portion overlapping said data electrode for forming a second storage capacitor, and a liquid crystal layer formed between the first and second substrates.

39 Claims, 12 Drawing Sheets

IN-PLANE SWITCHING MODE LIQUID CRYSTAL DISPLAY DEVICE INCLUDING COMMON ELECTRODE ON PASSIVATION LAYER WHICH IS FORMED OVER TFT AND DATA ELECTRODE

This application is a continuation of application Ser. No. 09/116,707, filed on Jul. 17, 1998, now U.S. Pat. No. 6,335,770.

BACKGROUND OF THE INVENTION

The present invention relates to a liquid crystal display device, and more particularly to an in-plane switching mode liquid crystal display device, wherein the aperture ratio is improved, the driving voltage is decreased, and the fabricating cost is reduced.

Recently, the thin film transistor liquid crystal display device(TFT LCD) has been used as a display device of a portable television and a notebook computer, etc., but this TFT LCD has a small viewing angle.

In order to solve this problem, a twisted nematic LCD having optical compensation plates and a multi-domain LCD, etc., have been introduced. In these LCDs, however, since the contrast ratio depends on the viewing angle direction, the color of the image is shifted.

For a wide viewing angle, the in-plane switching mode LCD is disclosed in JAPAN DISPLAY 92 p547, Japanese Patent Unexamined Publication No. 7-36058, Japanese Patent Unexamined Publication No. 7-225538, and ASIA DISPLAY 95 P707, and etc.

FIG. 1a and FIG. 1b are respectively plan and sectional views showing the conventional in-plane switching mode liquid crystal display device (IPS mode LCD), where FIG. 1b is a sectional view taken along line A–A' of FIG. 1a. As shown in these figures, a gate bus line 1 and a data bus line 2 are formed on a first substrate 10, defining a pixel. Although only one pixel is drawn in the figures, the real liquid crystal liquid display deice has a plurality of pixels. A common bus line 3 is aligned in the pixel, being parallel to the gate bus line 1. A thin film transistor (TFT) is disposed at the cross of the gate and data bus lines 1 and 2. As shown in FIG. 1b, the TFT comprises a gate electrode 5, agate insulator 12, an active layer 15, and n⁺ layer 16, a source electrode 6, and a drain electrode 7. In the pixel, a data electrode 8 and a common electrode 9 are formed parallel to the data bus line 2. A portion of the data electrode 8 which overlaps the common bus line 3 is formed to obtain a storage capacitor which functions as maintaining a grey level voltage applied into the data electrode 8. The common electrode 9 is connected to the common bus line 3. The data electrode 8 is formed on the gate insulator 12 and is connected to the drain electrode 7. The TFT, the data electrode 8 and the gate insulator 12 are covered with a passivation layer 20. Thereon, a first alignment layer 23a is coated to determine the alignment direction.

On a second substrate 11, a black mask 28 is formed to prevent a leakage of light through the regions of the TFT and the gate and data bus lines 1 and 2. Thereon, a color filter layer 29 and a second alignment layer 23b are formed. Between the first and second substrates 10 and 11, a liquid crystal layer 30 is formed.

When a voltage is applied to the conventional IPS mode LCD, electric field parallel to the substrates 10 and 11 is generated between the data and common electrodes 8 and 9. Liquid crystal molecules in the pixel are rotated according to the electric field, controlling the amount of light passing through the liquid crystal layer 30.

However, the conventional IPS mode LCD has the following problems.

Firstly, because the area for storage capacitor occupies quite a portion of the pixel region as well as the data and common electrodes are made of opaque metals, the aperture ratio is lowered.

Secondly, because the electric field applied to the LC layer is weakened by both the gate insulator 12 and the passivation layer 20 formed over the two electrodes 8 and 9, the driving speed of the LC molecules is decreased, and consequently the driving voltage is increased.

Thirdly, because the data bus line 2 should be apart from the pixel region to the extent of not generating the crosstalk problem, the pixel region is decreased, thereby lowering the aperture ratio.

Fourthly, when the black mask is formed on the second substrate, the fabricating cost is increased and the aperture ratio is lowered by the inaccurate lamination of the two substrates.

SUMMARY OF THE INVENTION

An object of the present invention is to provide an in-plane switching mode liquid crystal display device wherein the aperture ratio is improved, the driving voltage is decreased, and the fabricating cost is reduced.

In order to achieve the object, the in-plane switching mode liquid crystal display device comprises first and second substrates, a plurality of gate and data bus lines which are aligned on said first substrate to define a plurality of pixel regions, a common bus line aligned in said pixel regions of said first substrate, a thin film transistor formed at each of said pixel regions of said first substrate and comprising a gate electrode, a gate insulator, a semiconductor layer, a source electrode, and a drain electrode, a data electrode formed to be parallel to a first direction on said gate insulator and having a portion overlapping said common bus line for forming a first storage capacitor, a passivation layer formed over said data electrode and said thin film transistor, a common electrode formed on said passivation layer so as to overlap said gate and data bus lines and having a portion overlapping said data electrode for forming a second storage capacitor, and a liquid crystal layer formed between said first and second substrates.

Said common electrode is formed of ITO and is connected electrically to said common electrode through a first hole formed in said gate insulator and said passivation layer.

Said gate and data bus line may be formed of high conductive metal layers such as Mo metal layer, Mo/Al/Mo triple metal layers, or Cr/Al/Cr triple metal layers in order to prevent signal delay in said gate and data bus lines which is generated by being overlapped with said common electrode.

In the in-plane switching mode liquid crystal display device according to the present invention, the passivation layer and the gate insulator do not absorb the electric field applied to the liquid crystal layer because the common electrode is disposed above the two insulating layers. Accordingly, the driving voltage is lowered. Further, because the areas for storage capacitor can be decreased, the aperture ratio is much more improved. Furthermore, because the common electrode overlaps the gate and data bus lines to block the electric effect of the two bus lines, the crosstalk problem can be removed. Accordingly, the pixel region can be enlarged improving the aperture ratio. In addition, because the common electrode 109 is formed out of ITO to obtain IOP(ITO on passivation) structure, the contacting electric resistance between the pads and the driving circuits is decreased as well as the aperture ratio is improved.

According to another aspect of the present invention, the in-plane switching mode liquid crystal display device is provided, wherein said common electrode has an oblique side inclined relative to said first direction. The object of this embodiment is to prevent the problem in that disclination is generated in the region the common electrode crosses with the data electrode.

According to further aspect of the present invention, the in-plane switching mode liquid crystal display device is provided which further comprises a metal layer on said passivation layer in the region of said thin film transistor.

Said metal layer and said common electrode are formed of opaque metals including Mo, and function as black mask.

For obtaining IOP structure, said metal layer and said common electrode is formed of a double metal layer ITO/Mo which is formed by depositing Mo and indium tin oxide in the name order.

Said metal layer can be connected electrically to said data bus line through a second hole which is formed in said gate insulator and said passivation layer. In this case, the metal layer functions as a back gate electrode, increasing the switching speed of said thin film transistor.

BRIEF DESCRIPTION OF THE DRAWINGS

FIG. 2b and FIG. 2c are respectively sectional views taken along line B–B' and C–C' of FIG. 2a.

FIG. 11b and FIG. 11c are respectively sectional views taken along lines E–E' and F–F' of FIG. 11a.

DETAILED DESCRIPTION OF THE INVENTION

Hereinafter, in-plane switching mode LCDs according to the present invention are described in detail accompanying the figures.

Figure 1A:
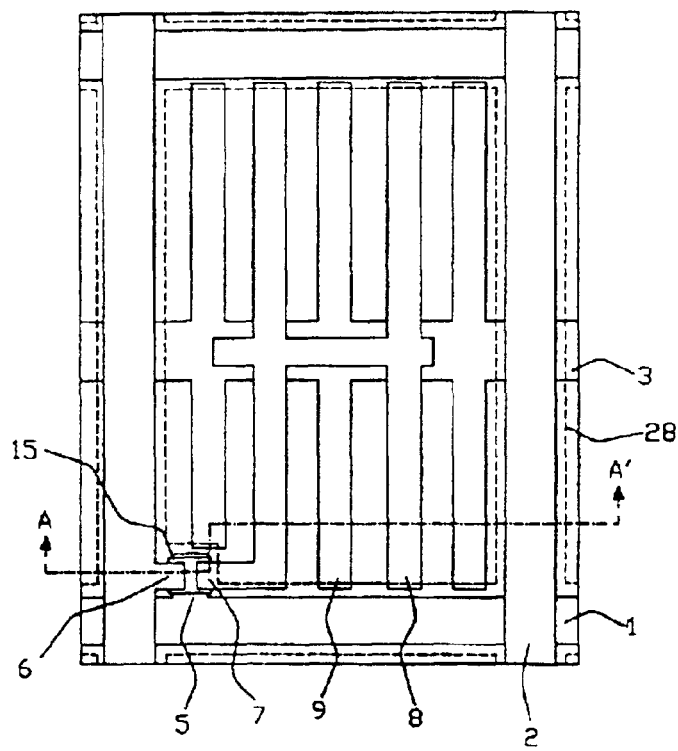
FIG. 1a and FIG. 1b are respectively plan and sectional views showing the conventional in-plane switching mode liquid crystal display device.
Figure 1B:
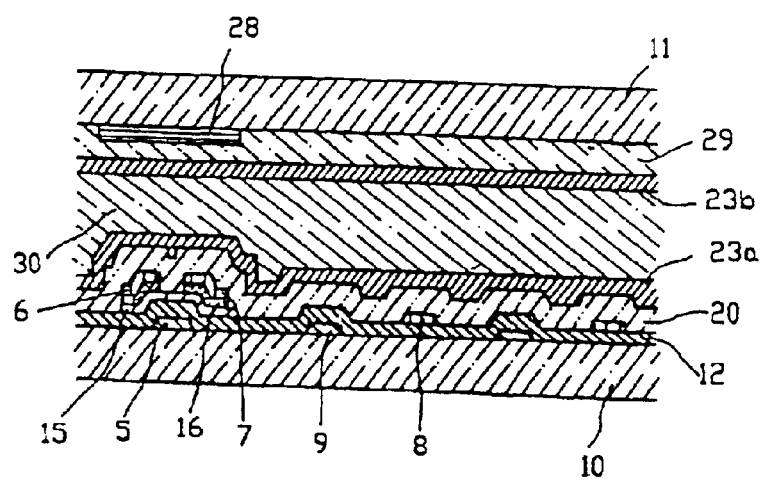
Figure 2A:
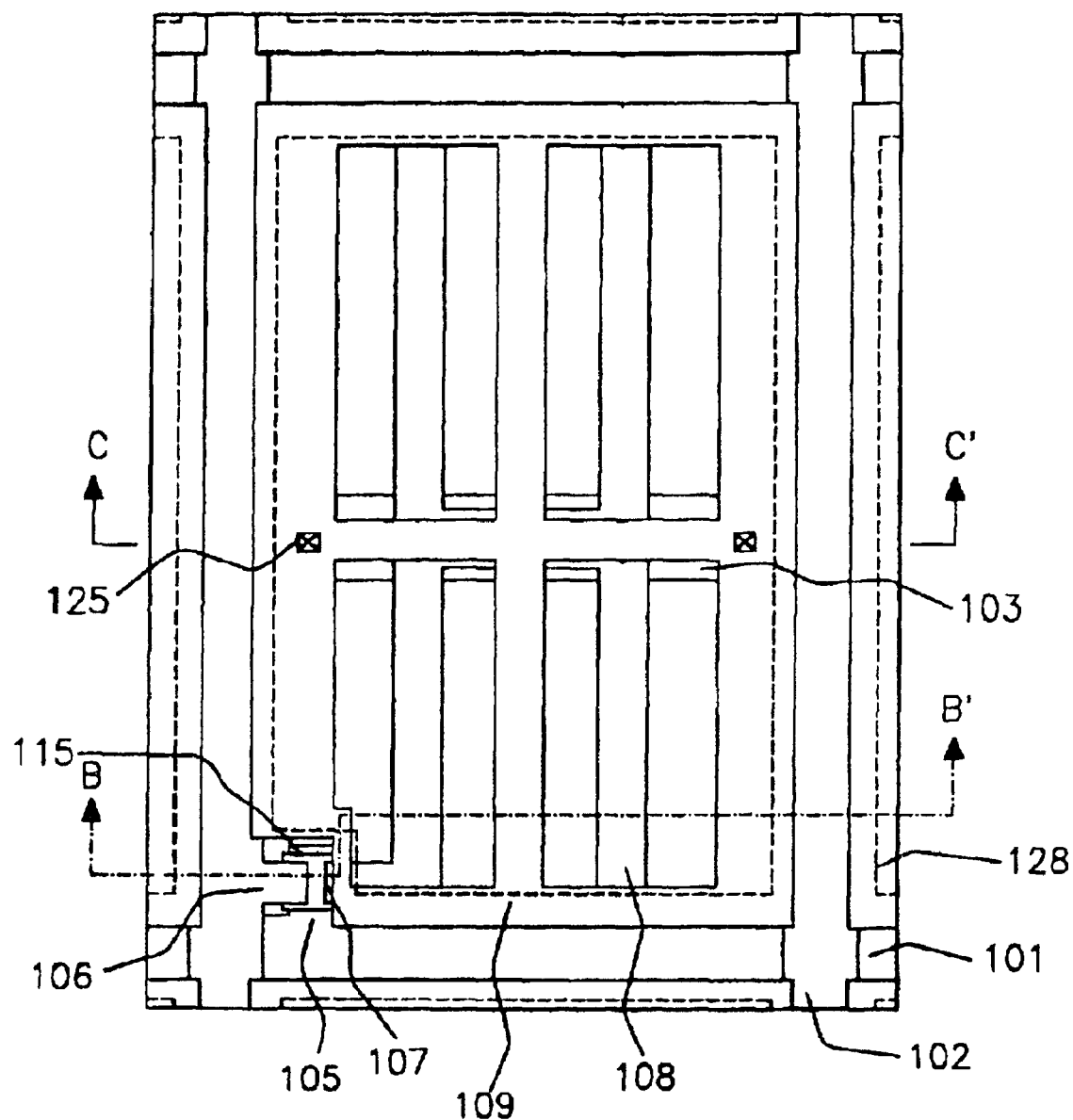
FIG. 2a is a plane view showing a first embodiment of the present invention.
Figure 2B:
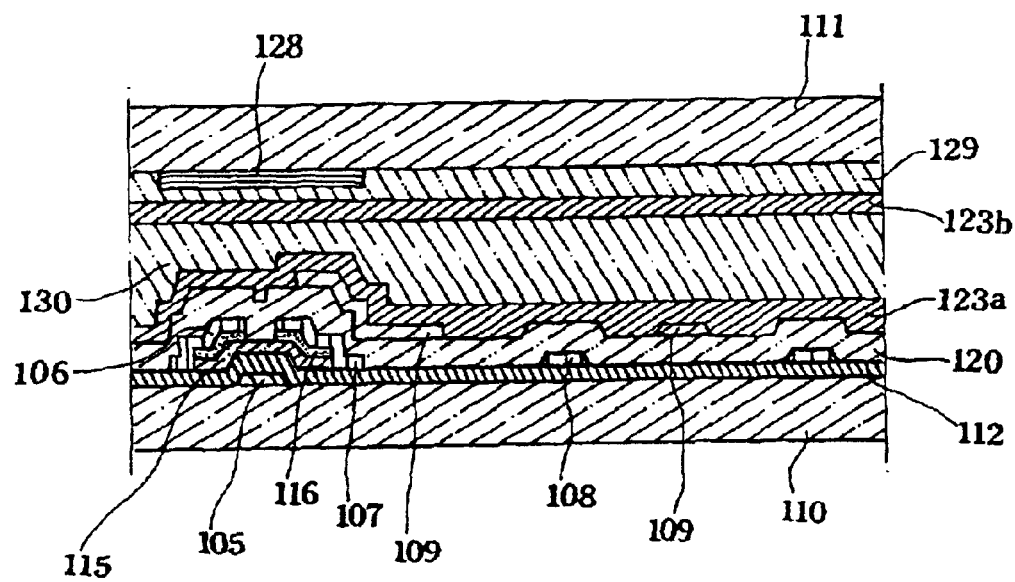
Figure 2C:
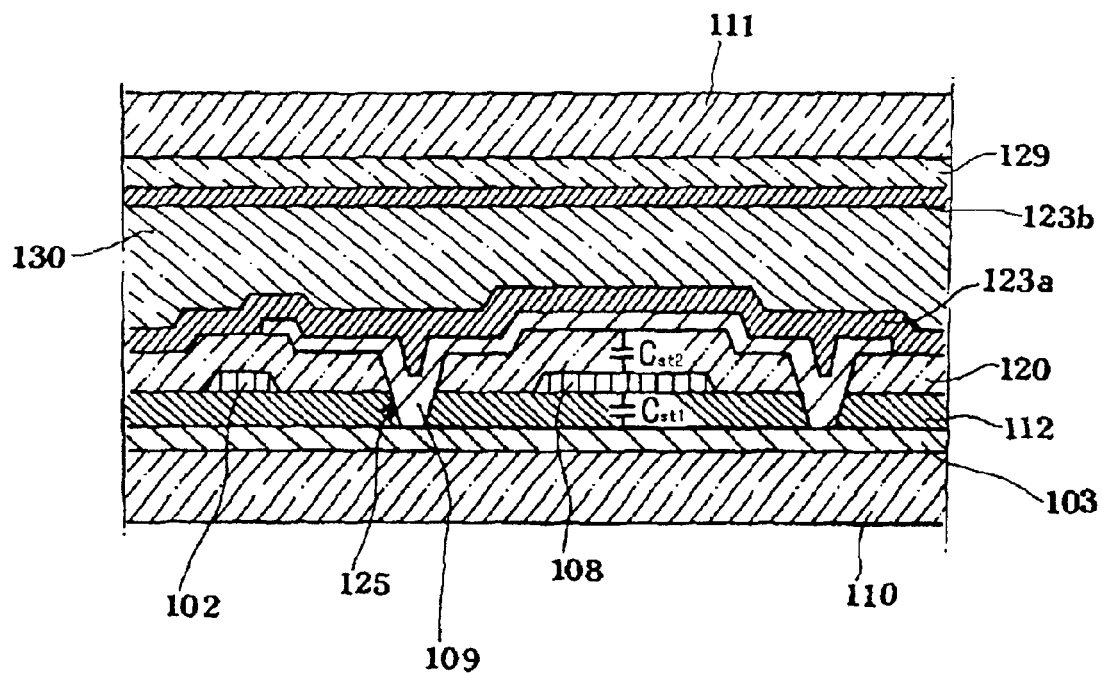

FIG. 2a, FIG. 2b and FIG. 2c are views showing a first embodiment according to the present invention, where FIG. 2b and FIG. 2c are respectively sectional views taken along line B–B' and line C–C' of the FIG. 2a. As shown in these figures, gate and data bus lines 101 and 102 are formed on a first substrate 110, defining a pixel. Although only one pixel is drawn in these figures, the real liquid crystal display device has a plurality of pixels. In the pixel, a common bus line 103 is formed parallel to the gate bus line 101. At the cross of the gate and data bus lines 101 and 102, a thin film transistor(TFT) is formed as shown in FIG. 2b which comprises a gate electrode 105, a gate insulator 112, an active layer 115, a n$^+$ layer 116, a source electrode 106, and a drain electrodes 107. In the pixel, data and common electrodes 108 and 109 are disposed parallel to the data bus line 102. Over the TFT and the data electrode 108, a passivation layer 120 is formed, and the common electrode 109 is formed thereon to be parallel to the data electrode 108 and overlap the gate and data bus lines 102 and 103. Over the common electrode 109 and the passivation layer 120, a first alignment layer 123a is formed.

As in the conventional IPS mode LCD, the data electrode 108 has a portion overlapping the common bus line 103 for obtaining a first storage capacitor ($C_{st1}$) as shown in FIGS. 2a and 2c. In addition, the common electrode 109 has a portion overlapping the data electrode 108 for obtaining a second storage capacitor ($C_{st2}$).

The common electrode 109 is connected to the common bus line 103 through a first hole 125 which is formed in the passivation layer 120 and the gate insulator 112, and it functions as blocking the electric effect of the two bus lines 101 and 102 to prevent the crosstalk problem.

The gate electrode 105, the gate bus line 101, and the common bus line 103 are formed by patterning double metal layers (Mo/Al) which is deposited by sputtering an Al layer having a thickness of 2000 Å and a Mo layer having a thickness of 1000 Å in the same order. The gate insulator 112 is formed thereon by depositing an inorganic insulating layer such as silicon nitride having a thickness of 4000 Å by a chemical vapor deposition method. The active layer 115 and the n$^+$ layer 116 are formed by depositing and etching an amorphous silicon (a-Si) layer having a thickness of 1700 Å and a n$^+$ a-Si layer having a thickness of 300 Å. The data bus line 102, the data electrode 108, the source electrode 106, and the drain electrode 107 are formed by depositing and etching a Cr metal layer having a thickness of 1500 Å.

The TFT, and the data electrode 108 are covered with a passivation layer 120 such as silicon oxide and silicon nitride having a thickness of 2000 Å. On the passivation layer 120, the common electrode 109 is formed by depositing and etching a transparent conducting layer such as indium tin oxide (ITO) having a thickness of 500 Å.

Over the common electrode 109 and the passivation layer 120, a first alignment layer 123a is formed by coating polyimide or photo-alignment materials. The polyimide alignment layer is rubbed for determining the alignment direction. On the other hand, the photo-alignment layer such as polyvinylcinnamate (PVCN) or polysiloxane based materials is exposed to a ultra violet light for determining the alignment direction.

As shown in the FIG. 2c, the data and common electrodes 108 and 109 have portions for first and second storage capacitors ($C_{st1}$, $C_{st2}$). Accordingly, the total storage capacitor ($C_{st}$) in the present invention becomes the sum of the first and second storage capacitors ($C_{st1}$, $C_{st2}$). The storage capacitor ($C_{st}$) is double the conventional storage capacitor ($C_{stl}$), so that the area for storage capacitor can be reduced to half the conventional area, thereby improving the aperture ratio.

As shown in FIG. 3b, on a second substrate 111, a black mask 128 and a color filter layer 129 are formed. An overcoat layer may be formed thereon for the flatness and stability of the surface thereof. The black mask 128 prevents a leakage of light through the regions of TFT and gate, data and common bus lines 101, 102, and 103. The black mask 128 is made of a Cr or a CrOx metal layer having a thickness of 0.1 μm and a width of 10 μm. The color filter layer 129 has R, G, and B color filter elements in each pixels. On the color filter layer 129, a second alignment layer 123b is formed by coating polyimide or photo-alignment materials. The second alignment layer 123b is rubbed or exposed to UV light for determining the alignment direction. A liquid crystal layer 130 is formed between the two substrates 110 and 111 by injecting liquid crystal in vacuum state.

Figure 3:
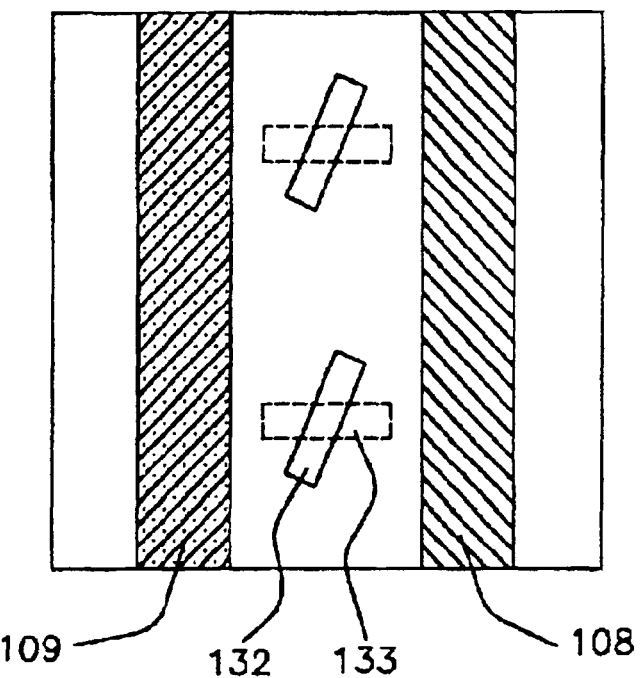
FIG. 3 is a view showing the operation of liquid crystal molecules in the first embodiment.
Figure 4:
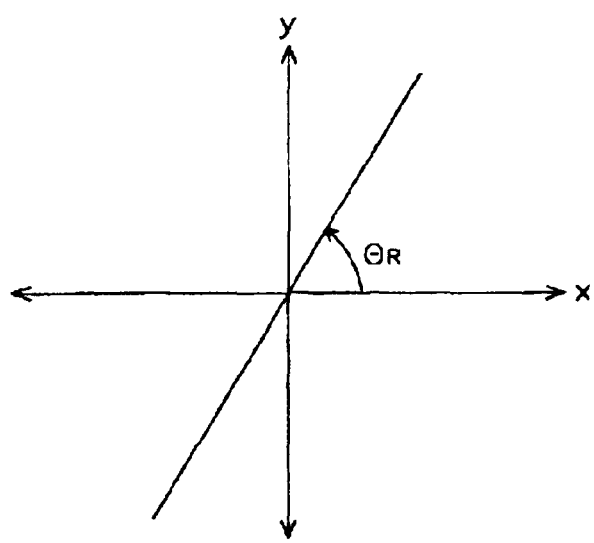
FIG. 4 is a view showing the alignment direction in the first embodiment.

FIG. 3 is a view showing the operation of a liquid crystal molecule in the IPS mode LCD according to the present invention. FIG. 4 is a view showing the alignment direction, where Y axis direction indicates the extension direction of the data and common electrodes 108 and 109, and $\theta_R$ indicates the angle between the alignment direction and X axis direction. When a voltage is not applied to the device, the liquid crystal molecules are aligned according to the alignment direction. When a voltage is applied to the device, electric field parallel to the substrates is generated between the common and data electrodes 109 and 108, and thereby the liquid crystal molecules 132 rotates clockwise according to the electric field. In this figure, a reference number 133 indicates the liquid crystal molecules after applying the voltage.

Figure 5:
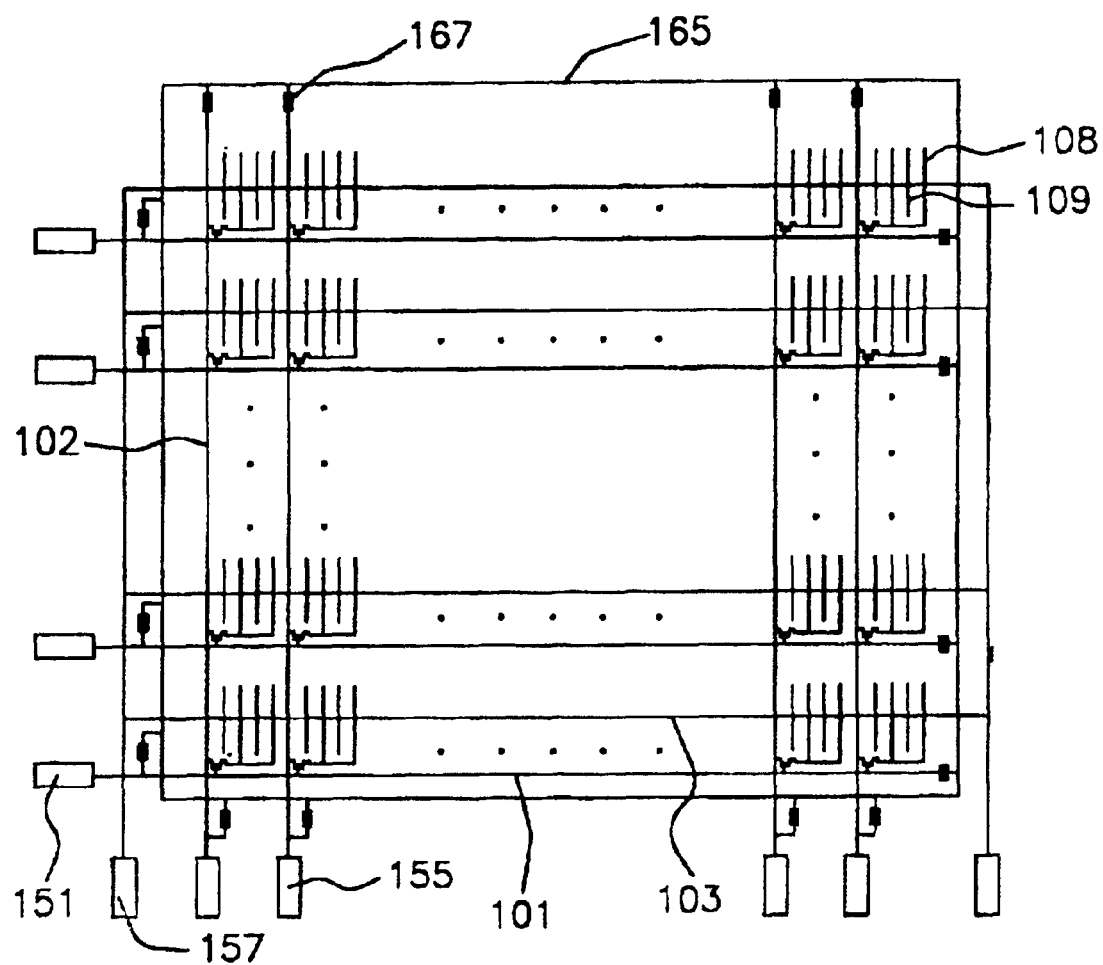
FIG. 5 is a view showing the TFT array structure of the present invention.

FIG. 5 is a view showing the TFT array structure of the present invention. The gate and data bus lines 101 and 102 are connected to gate and data driving circuits through gate and data pads 151 and 155 respectively. The gate and data bus lines 101 and 102 are connected to a grounding wiring 165 through an electrostatic shielding circuit 167 composed of TFT. Also the common bus line 103 is grounded through the common pad 157.

Although not illustrated in the figure, the gate, data and common pads 151, 155 and 157 are made of first, second and third metal layers. The first metal layer is formed of Mo/Al double metal layers together with the gate electrode 105 and common bus line 103. The second metal layer is formed of Cr together with the source and drain electrodes 106 and 107. The third metal layer is formed of ITO together with the common electrode 109. In order to connect the pads to the driving circuits, it is necessary to etch the gate insulator 112 and the passivation layer 120 in the pad region. The two insulating layers in the pad region are etched when the hole 125 is formed. In the prior art, an oxide layer is generated on the pads by the exposure to the air, causing a problem that the contacting electric resistance is increased when connecting the pads to the driving circuits. However, in this embodiment, because the third metal layer of the pads is made of ITO for obtaining IOP(ITO On Passivation) structure, the above-mentioned problem is not generated.

Figure 6A:
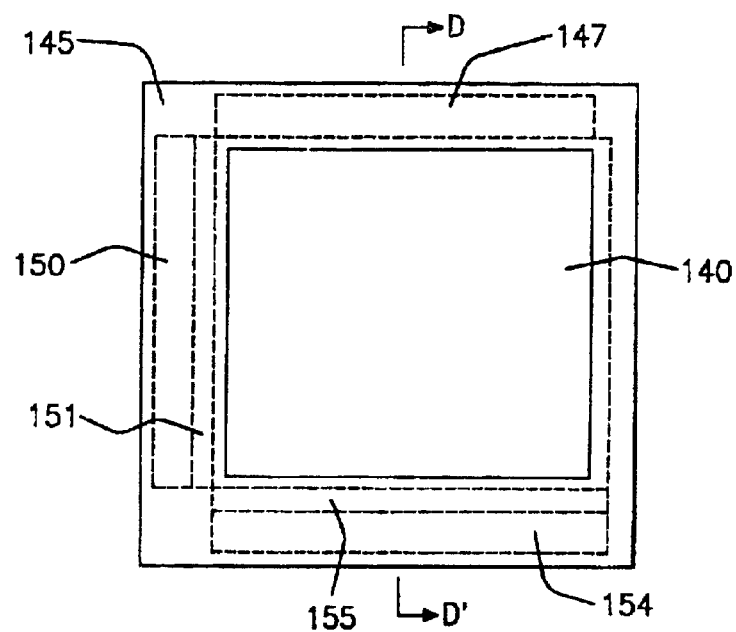
FIG. 6a and FIG. 6b are respectively plan and sectional views showing the structure of the IPS mode LCD according to the present invention.
Figure 6B:
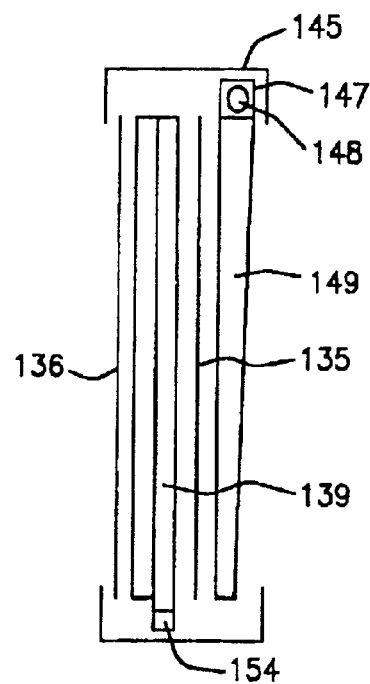

FIG. 6a and FIG. 6b are plan and sectional views showing the structure of the in-plane switching mode LCD according to the present invention, where the FIG. 6b is a sectional view taken along line D–D' of the FIG. 6a. As shown in these figures, gate and data driving circuits 150 and 154 are disposed in a frame 145 outside the display region 140. The gate and data driving circuits 150 and 154 are connected to the gate and data bus lines 101 and 102 through the gate and data pads 151 and 154 respectively. A backlight housing 147 is disposed on the upper side of the frame 145. In the backlight housing 147, a backlight 148 is disposed to project a light into a liquid crystal panel 139 through a light pipe 149. Between the light pipe 149 and the liquid crystal panel 139, a polarizer 135 is disposed to polarize the light linearly. An analyzer 136 is disposed on the front of the panel 139.

The advantages of the first embodiment according to the present invention are summarized as follows.

Firstly, the passivation layer 120 and the gate insulator 112 do not absorb the electric field applied to the liquid crystal layer 130 because the common electrode 109 is disposed above the two insulating layers 112 and 120. Accordingly, the driving voltage is lowered.

Secondly, because the areas for storage capacitor can be decreased, the aperture ratio is much more improved.

Thirdly, because the common electrode 109 overlaps the gate and data bus lines 101 and 102 to block the electric effect of the two bus lines 101 and 102, the crosstalk problem can be removed. Accordingly, the pixel region can be enlarged improving the aperture ratio.

Fourthly, because the common electrode 109 is formed out of ITO to obtain IOP structure, the contacting electric resistance between the pads and the driving circuits is decreased as well as the aperture ratio is improved.

Figure 7:
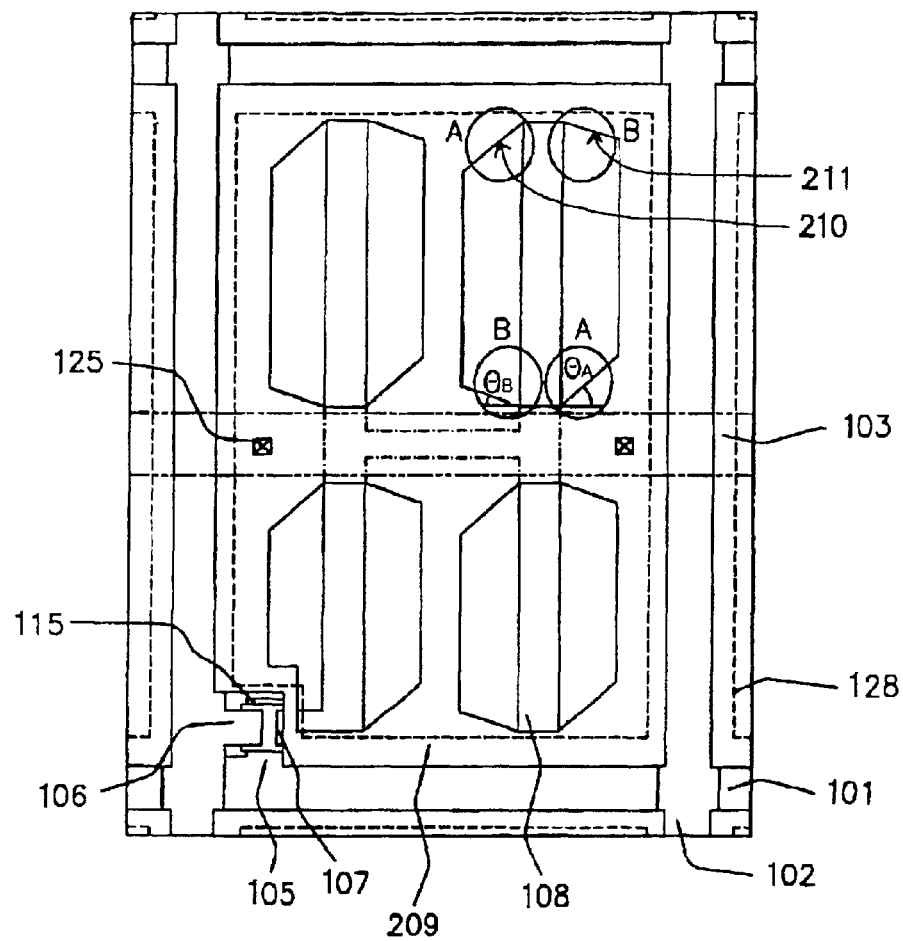
FIG. 7 is a plane view showing a second embodiment of the present invention.
Figure 8:
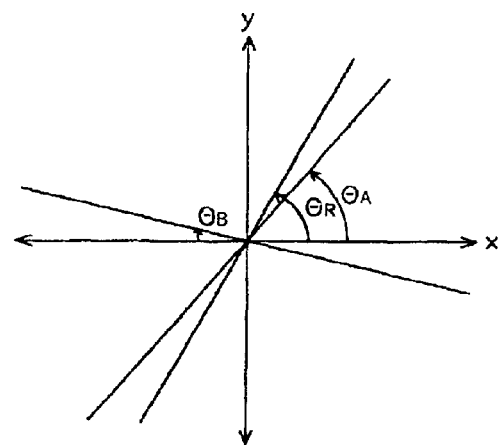
FIG. 8 is a view showing the alignment direction and the direction of first and second oblique sides of the second embodiment.

FIG. 7 is a view showing a second embodiment of the present invention. Hereinafter, constituent elements similar to those of the first embodiment are denoted by the same reference numbers. As shown in this figure, this embodiment differs from the first embodiment in that a common electrode 209 has first and second oblique sides 120 and 121. FIG. 8 is a view showing the alignment direction and the direction of the first and second oblique sides of the second embodiment, where Y axis indicates the extension direction of the data electrode 108. In region A, the first oblique side 210 is inclined counterclockwise to X axis direction with an angle $\theta_A$. In region B, the second oblique side 210 is inclined clockwise to X axis direction with an angle $\theta_B$. The alignment direction is determined to be inclined counterclockwise to X axis direction with an angle $\theta_R$ in the range of 0° to 90°. The angle $\theta_A$ is determined to be in the range of $\theta_R$ to 90°. The angle $\theta_B$ is determined to be in the range of 90°−$\theta_R$ to 90°. The figures show a case where the angle $\theta_R$ is larger than 45°, and thereby the angle $\theta_A$ is larger than the angle $\theta_B$. On the contrary, when the angle $\theta_R$ is smaller than 45°, the angle $\theta_B$ is determined to be larger than the angle $\theta_A$.

The object of this embodiment is to prevent the problem of the first embodiment in that disclination is generated in the region the common electrode 209 crosses with the data electrode 109.

Figure 9A:
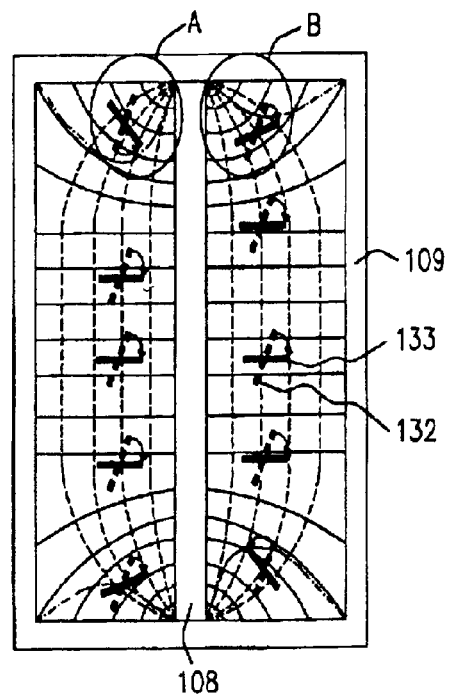
FIG. 9a and FIG. 9b are views the direction of electric field and the operation of LC molecules in the first and second embodiments respectively.

In the first embodiment, the electric field is generated between the common and data electrodes 108 and 109 as shown in FIG. 9a. In the middle region of the opening portion, the direction of electric field is perpendicular to the extension direction of the electrodes 108 and 109. When voltage is applied to the device, in the middle region, the LC molecules 132 are given with a clockwise turning force according to the electric field perpendicular to the extension direction of the electrodes 108 and 109, and thereby they rotate clockwise to be aligned perpendicular to the extension direction of the electrodes. On the other hand, in regions A and B where the common electrode 109 crosses with the data electrode 108, electric field is deformed not to be perpendicular to the extension direction of the electrodes 108 and 109. When the voltage is applied to the electrodes 108 and 109, in the regions A and B, the LC molecules 132 are aligned to be different from the middle region. Particularly in the region bounded by chain lines, the LC molecules are given with a counterclockwise turning force according to the deformed electric field, and thereby they rotate in opposite direction to those in the middle region. Consequently, in the border region denoted by chain lines, the alignment of LC molecules 132 is not defined, thereby generating disclination. Particularly when using liquid crystal having a low viscosity for lowering the driving voltage, since the interaction between the LC molecules 132 is weak, a possibility of generating the disclination is increased to deteriorate the image quality. In this figure, reference number 133 denotes LC molecules after applying the voltage.

Figure 9B:
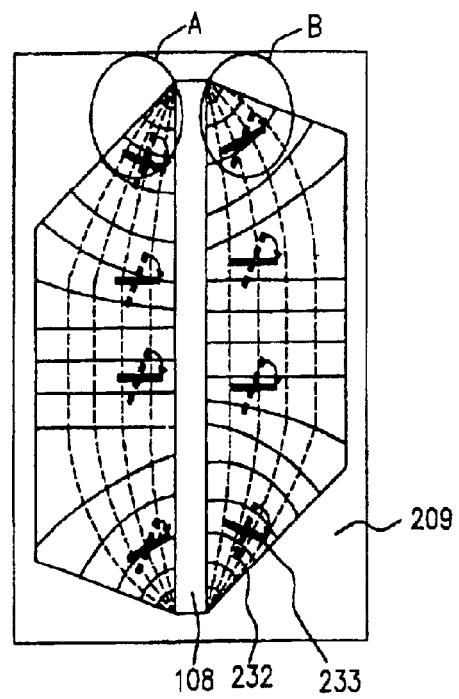

However, in the second embodiment, since the common electrode 209 has first and second oblique sides 210 and 211, as shown in FIG. 7, the electric field is slightly deformed in the regions A and B, as shown in FIG. 9b. The electric field gives a clockwise turning force to the LC molecules 232 in the regions A and B. Accordingly, although using liquid crystal having a low viscosity for lowering the driving voltage, LC molecules 232 in regions A and B rotate in the same direction with those in the middle region, thereby preventing the disclination. In FIG. 9b, reference number 233 denotes LC molecules after applying the voltage.

The second embodiment has an aperture ratio lower than the first embodiment, and however has a more improved image quality by preventing the disclination. In this case, it is preferable to form the common electrode 209 out of ITO for improving the aperture ratio.

Figure 10:
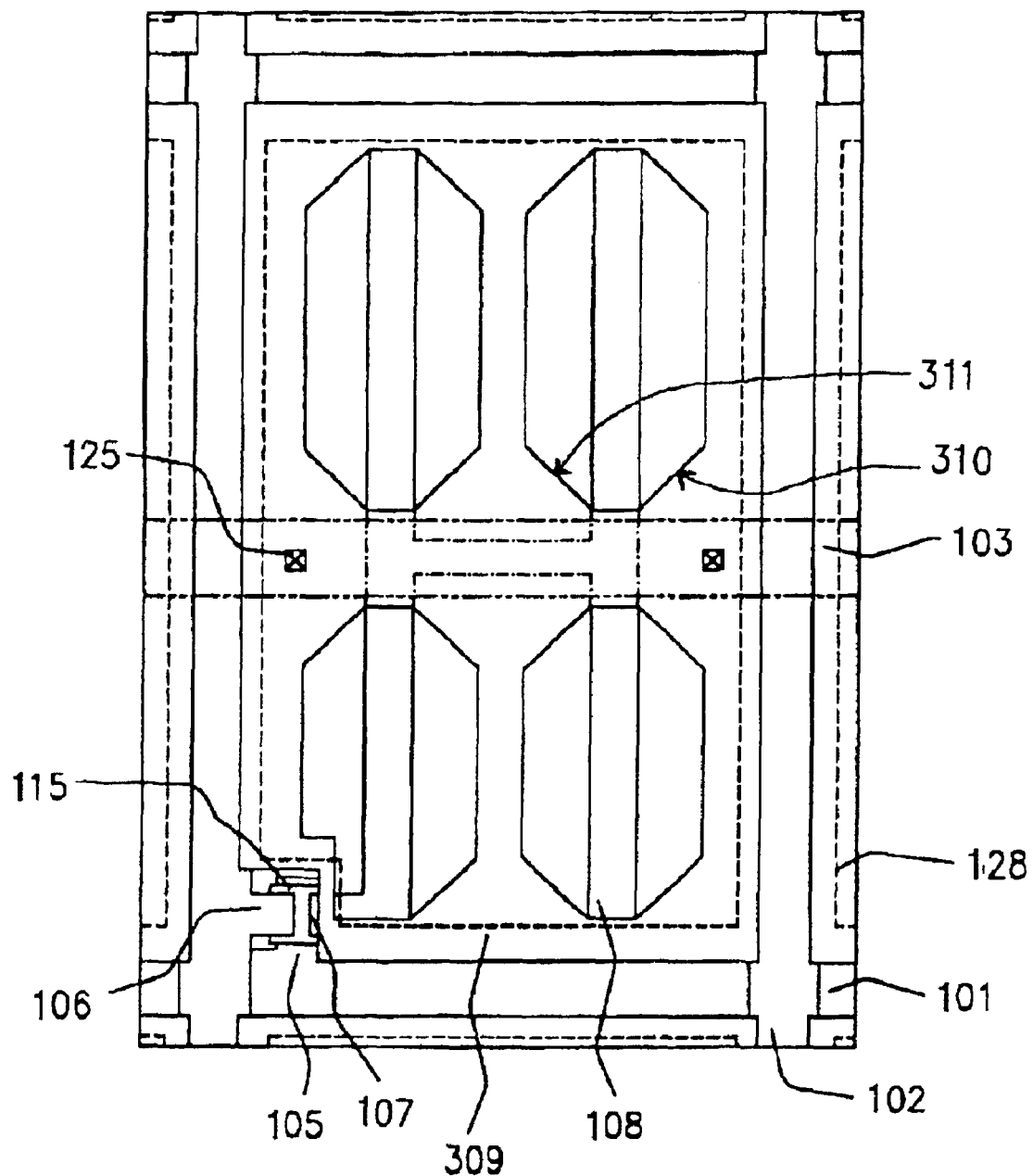
FIG. 10 is a plan view showing a third embodiment of the present invention.

FIG. 10 is a view showing a third embodiment. This embodiment is similar to the second embodiment excepting the angles $\theta_A$ and $\theta_B$ of the common electrode 309. It is determined in this embodiment that the angles $\theta_A$, $\theta_B$ and $\theta_R$ are 45°, 45°, and 75° respectively. In region B, because the angle $\theta_B$ is in said range of $90°-\theta_R$ to 90°, the LC molecules are given with a clockwise turning force, thereby not generating the disclination. In the other hand, in region A, since the angle $\theta_A$ is out of said range of $\theta_R$ to 90°, the LC molecules are given with a counterclockwise turning force. However, unless using liquid crystal having a low viscosity, the disclination is not generated with the assistance of interaction between the LC molecules. Further, considering the viscosity, the angle $\theta_B$ can be determined to be less than 25°, $90°-\theta_R$, for improving the aperture ratio.

Figure 11A:
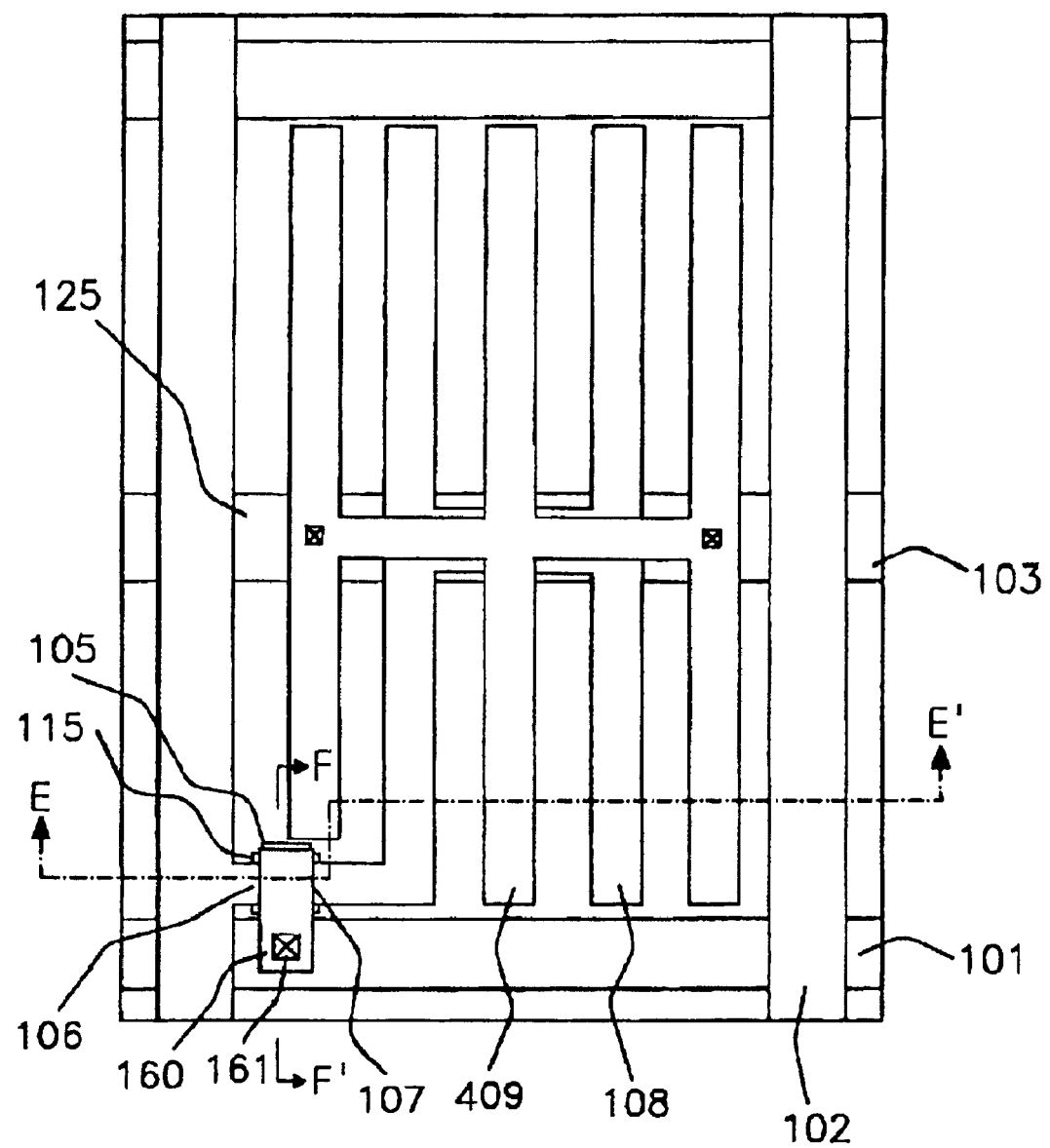
FIG. 11a is a plan view showing a fourth embodiment of the present invention.
Figure 11B:
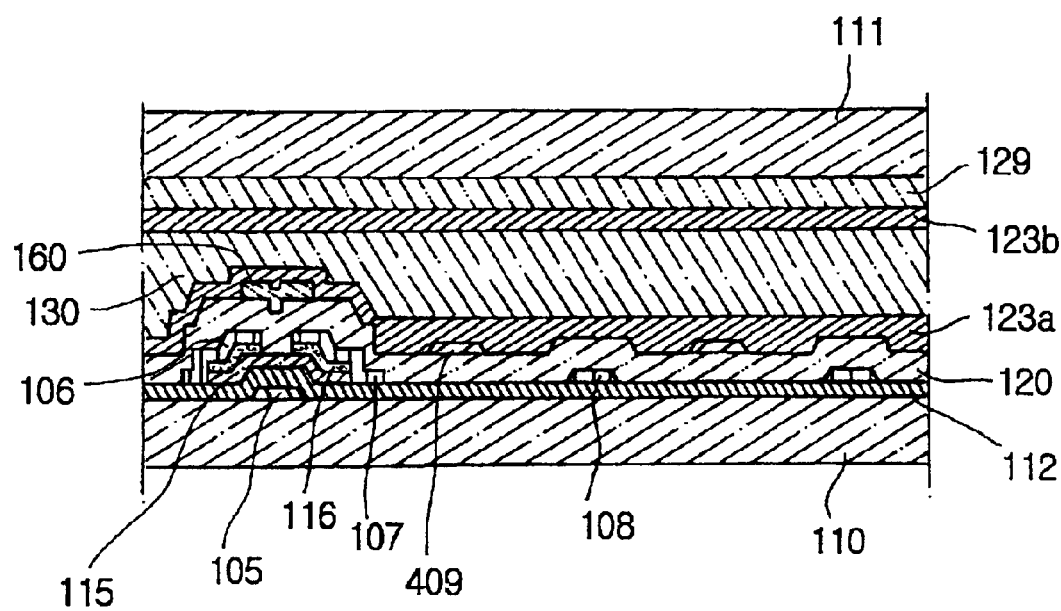
Figure 11C:
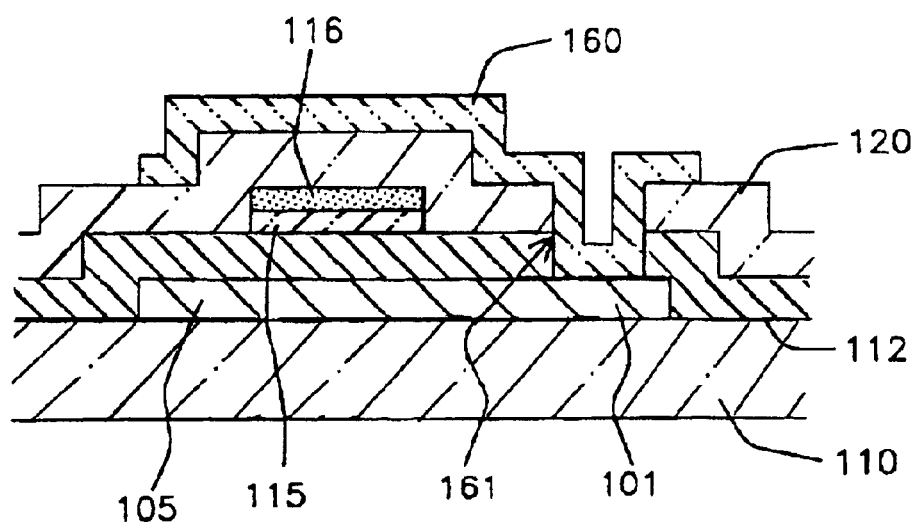

FIG. 11a, 11b, and 11c are plan and sectional views showing the fourth embodiment, where FIG. 11b and 11c are sectional views taken along lines E–E' and F–F' of FIG. 11a.

In this embodiment, as shown in these figures, the data and common electrodes 108 and 409 have portions for first and second storage capacitors ($C_{st1}$,$C_{st2}$) as in the previous embodiments. This embodiment differs from the previous embodiments in that the common electrode does not overlap the gate and data bus lines 101 and 102, and a light shielding electrode 160 is formed on the passivation layer 120 in the region of the TFT. The common electrode 409 and the light shielding electrode 160 are formed together by sputtering and etching Mo metal layer having a thickness of 1000 Å. Because the light shielding electrode 160 functions as a black mask for the TFT, as shown in FIG. 11b, the black mask is not formed in the region of TFT. For obtaining IOP structure, the two electrodes 409 and 160 are formed of metal layers including ITO, and it is preferable that they are formed of a double layer ITO/Mo which is formed by depositing Mo metal layer and ITO in the name order. The light shielding electrode 160 is formed to overlap a portion of the gate bus line 101 so as to be connected with the gate bus line 101 through a second hole 161 formed in the gate insulator 112 and the passivation layer 120. Accordingly, the light shielding electrode 160 is provided with the same voltage as the gate electrode 105.

In this embodiment, since the light shielding electrode 160 overlaps the TFT with the passivation layer 120 interposed therebetween in order to prevent a light incident on the active layer 115 of the TFT. Accordingly, there is no need to form a black mask in the region of TFT, decreasing the fabricating cost. Further, the leakage current is prevented which is generated by excitation of the active layer 115 when the active layer 115 is exposed to light, so that a backlight having a high light intensity can be used improving the luminosity of the device.

In addition, since the light shielding electrode 160 is connected with the gate bus line for obtaining the same voltage as the gate electrode 105, it functions as a back gate electrode increasing the switching current of the TFT. Accordingly, switching speed of the TFT is increased so that the same switching speed as the prior art can be obtained using TFT of relatively small size.

Figure 12:
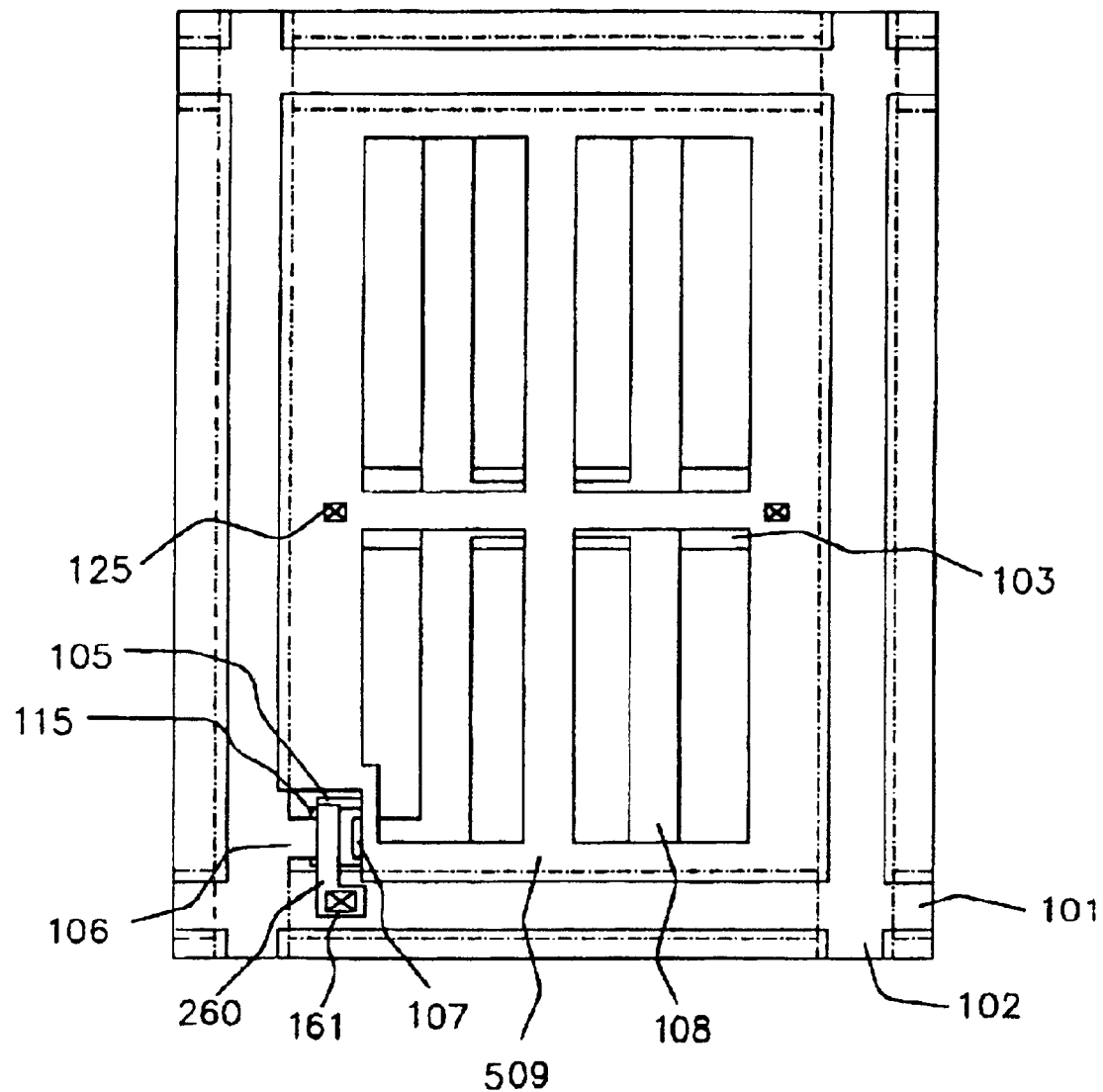
FIG. 12 is a plan view showing a fifth embodiment of the present invention.

FIG. 12 is a view showing a fifth embodiment. As shown in this figure, this embodiment is similar to the fourth embodiment except that a common electrode 509 overlaps the gate and data bus lines 101 and 102 as the first, second, and third embodiments.

The common electrode 509 and a light shielding electrode 260 are formed of opaque metals as the fourth embodiment, and function as a light shielding layer so that there is no need to form a black mask in the regions of the TFT, and the two bus lines 101 and 102. Accordingly, the fabricating cost for the black mask is reduced, and prevented is the conventional problem in that the aperture ratio is lowered by inaccurate lamination when forming the black mask on the second substrate. Further, as the fourth embodiment, the light shielding electrode 260 prevents a light incident on the active layer.

In the first, second, third, and fifth embodiments, a parasitic capacitor may be formed between the common electrode and the gate and data bus lines, causing the signal delay in the two bus lines. This signal delay problem can be removed by forming the gate and data bus lines out of low resistance metal layers such as Mo metal later, Mo/Al/Mo triple metal layers or Cr/Al/Cr triple metal layers.

The present invention is characterized in that the common electrode is formed on the passivation layer 120, and the data and common electrodes have portions for first and second storage capacitors ($C_{st1}$,$C_{st2}$). Accordingly, the passivation layer 120 and the gate insulator 112 do not absorb the electric field applied to the liquid crystal layer 130 because the common electrode is disposed above the two insulating layers 112 and 120. Accordingly, the driving voltage is lowered. Further, because the areas for storage capacitor can be decreased, the aperture ratio is much more improved. Furthermore, because the common electrode is formed out of ITO for obtaining IOP structure, the contacting electric resistance between the pads and the driving circuits is decreased as well as the aperture ratio is improved.

In first, second, third, and fifth embodiments according to the present invention, because the common electrode overlaps the gate and data bus lines to block the electric effect of the two bus lines, the crosstalk problem can be removed. Accordingly, the pixel region can be enlarged improving the aperture ratio.

In fourth and fifth embodiments, the light shielding electrode functions as a back gate electrode for increasing the switching speed of TFT, and prevents a leakage current caused by excitation of the active layer. Particularly in the fifth embodiment, since the light shielding electrode and the common electrode function as a black mask, there is no need to form the black mask in the regions of TFT and the two bus lines 101 and 102, removing the problems generated when forming the black mask on the second substrate.

While the preferred form of the present invention has been described, it is to be understood that modifications will be apparent to those skilled in the art without departing from the spirit of the invention.

The scope of the invention, therefore, is to be determined solely by the following claims.

What is claimed is:

1. An in-plane switching mode liquid crystal display comprising:
   gate and data bus lines on a first substrate defining a pixel region;
   a common bus line parallel to the gate bus line;
   a thin film transistor at a crossing of the gate and data bus lines, the thin film transistor having a gate electrode, a gate insulator, a semiconductor layer, a source electrode, and a drain electrode;
   data and common electrodes parallel to the data bus line in the pixel region, the data electrodes including a first capacitor portion overlapping the common line and the common electrodes including a second capacitor portion overlapping the common line, the first and second capacitor portions substantially parallel to the gate bus line, for first and second storage capacitors, respectively;
   a passivation layer over the thin film transistor and the data electrode, wherein the common electrode is formed on the passivation layer parallel to the data electrode and overlapping the gate and data bus lines; and
   a first alignment layer on the common electrode.

2. The in-plane switching mode liquid crystal display of claim 1, further comprising a black mask and a color filter on a second substrate opposite to the first substrate.

3. The in-plane switching mode liquid crystal display of claim 2, wherein the black mask includes one of a Cr and a CrOx metal layer.

4. The in-plane switching mode liquid crystal display of claim 3, wherein the metal layer has a thickness of about 0.1 μm and a width of about 10 μm.

5. The in-plane switching mode liquid crystal display of claim 2, further comprising a second alignment layer on the color filter layer.

6. The in-plane switching mode liquid crystal display of claim 5, wherein the second alignment layer includes one of polyimide and photo-alignment materials.

7. The in-plane switching mode liquid crystal display of claim 2, further comprising a liquid crystal layer between the first and second substrates.

8. The in-plane switching mode liquid crystal display of claim 1, further comprising gate, data, and common pads connected to driving circuits.

9. The in-plane switching mode liquid crystal display of claim 8, wherein the gate and data bus lines are connected to the driving circuits.

10. The in-plane switching mode liquid crystal display of claim 8, wherein the common bus line is grounded through the common pad.

11. The in-plane switching mode liquid crystal display of claim 8, wherein the gate, data and common pads include first, second and third metal layers, respectively.

12. The in-plane switching mode liquid crystal display of claim 11, wherein the first metal layers includes Mo/Al double metal layers together with the gate electrode and common bus line.

13. The in-plane switching mode liquid crystal display of claim 11, wherein the second metal layer includes Cr together with the source and drain electrodes.

14. The in-plane switching mode liquid crystal display of claim 11, wherein the third metal layer includes indium tin oxide together with the common electrode.

15. The in-plane switching mode liquid crystal display of claim 1, further comprising a grounding wiring connected to the gate and data bus lines through an electrostatic shielding circuit.

16. An in-plane switching mode liquid crystal display comprising:
   gate and data bus lines on a first substrate defining a pixel region;
   a common bus line parallel to the gate bus line;
   a thin film transistor at a crossing of the gate and data bus lines, the thin film transistor having a gate electrode, a gate insulator, a semiconductor layer, a source electrode, and a drain electrode;
   data electrodes parallel to the data bus line in the pixel region,
   common electrodes including parallel portions substantially parallel to the data bus line and a connecting portion substantially parallel to the gate bus line, the parallel portions extending from the connecting portion and having an oblique side, wherein the oblique side is located at a crossing of the data electrodes and common electrodes;
   a passivation layer over the thin film transistor and the data electrode; and
   a first alignment layer on the common electrode.

17. The in-plane switching mode liquid crystal display of claim 16, wherein the oblique side is inclined counterclockwise to an X axis direction with an angle $\theta_A$.

18. The in-plane switching mode liquid crystal display of claim 17, wherein an alignment direction is inclined counterclockwise to an X axis direction with an angle $\theta_R$.

19. The in-plane switching mode liquid crystal display of claim 18, wherein the range of $\theta_R$ is about 0° to 90°.

20. The in-plane switching mode liquid crystal display of claim 19, wherein the range of $\theta_A$ is about $\theta_R$ to 90°.

21. The in-plane switching mode liquid crystal display of claim 18, wherein $\theta_R$ is about 75°.

22. The in-plane switching mode liquid crystal display of claim 17, wherein $\theta_A$ is about 45°.

23. The in-plane switching mode liquid crystal display of claim 16, wherein the oblique side is inclined clockwise to an X axis direction with an angle $\theta_B$.

24. The in-plane switching mode liquid crystal display of claim 23, wherein an alignment direction is inclined counterclockwise to an X axis direction with an angle $\theta_R$.

25. The in-plane switching mode liquid crystal display of claim 24, wherein the range of $\theta_R$ is about 0° to 90°.

26. The in-plane switching mode liquid crystal display of claim 25, wherein the range of $\theta_B$ is about 90°−$\theta_R$ to 90°.

27. The in-plane switching mode liquid crystal display of claim 24, wherein $\theta_R$ is about 75°.

28. The in-plane switching mode liquid crystal display of claim 23, wherein $\theta_B$ is about 45°.

29. The in-plane switching mode liquid crystal display of claim 16, wherein the common electrode is formed on the passivation layer.

30. The in-plane switching mode liquid crystal display of claim 16, wherein the common electrode overlaps the gate and data bus lines.

31. The in-plane switching mode liquid crystal display of claim 16, wherein the data and common electrodes have portions for first and second storage capacitors.

32. An in-plane switching mode liquid crystal display comprising:

gate and data bus lines on a first substrate defining a pixel region;

a common bus line parallel to the gate bus line;

a thin film transistor at a crossing of the gate and data bus lines, the thin film transistor having a gate electrode, a gate insulator, a semiconductor layer, a source electrode, and a drain electrode;

data and common electrodes parallel to the data bus line in the pixel region, the data electrodes including a first capacitor portion overlapping the common line and the common electrodes including a second capacitor portion overlapping the common line, the first and second capacitor portions substantially parallel to the gate bus line;

a passivation layer over the thin film transistor and the data electrode, wherein the common electrode is formed on the passivation layer parallel to the data electrode;

a light shielding layer on the passivation layer; and a first alignment layer on the common electrode.

33. The in-plane switching mode liquid crystal display of claim 32, wherein the common electrode and the light shielding layer include Mo and indium tin oxide.

34. The in-plane switching mode liquid crystal display of claim 33, wherein the thickness of the Mo is about 1000 Å.

35. The in-plane switching mode liquid crystal display of claim 32, wherein the data and common electrodes have portions for first and second storage capacitors.

36. An in-plane switching mode liquid crystal display, comprising:

gate and data bus lines on a first substrate defining a pixel region;

a common bus line parallel to the gate bus line;

a thin film transistor at a crossing of the gate and date bus lines, the thin film transistor having a gate electrode, a gate insulator, a semiconductor layer, a source electrode, and a drain electrode;

data and common electrodes parallel to the data bus line in the pixel region;

a passivation layer over the thin film transistor and the data electrode, wherein the common electrode is formed on the passivation layer parallel to the data electrode;

a light shielding layer on the passivation layer; and a first alignment layer on the common electrode, wherein the light shielding layer overlaps a portion of the gate bus line through a hole in the gate insulator and the passivation layer.

37. An in-plane switching mode liquid crystal display comprising:

gate and data bus lines on a first substrate defining a pixel region;

a common bus line parallel to the gate bus line;

a thin film transistor at a crossing of the gate and data bus lines, the thin film transistor having a gate electrode, a gate insulator, a semiconductor layer, a source electrode, and a drain electrode;

data and common electrodes parallel to the data bus line in the pixel region, the data electrodes including a first capacitor portion overlapping the common line and the common electrodes including a second capacitor portion overlapping the common line, the first and second capacitor portions substantially parallel to the gate bus line;

a passivation layer over the thin film transistor and the data electrode, wherein the common electrode is formed on the passivation layer parallel to the data electrode and overlaps the gate and data bus lines;

a light shielding layer on the passivation layer; and a first alignment layer on the common electrode.

38. The in-plane switching mode liquid crystal display of claim 37, wherein the common electrode and the light shielding layer include opaque materials.

39. The in-plane switching mode liquid crystal display of claim 37, wherein the data and common electrodes have portions for first and second storage capacitors.

* * * * *